(12) United States Patent
Yamaguchi

(10) Patent No.: US 10,218,953 B2
(45) Date of Patent: Feb. 26, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Shota Yamaguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 15/272,628

(22) Filed: Sep. 22, 2016

(65) Prior Publication Data

US 2017/0094242 A1 Mar. 30, 2017

(30) Foreign Application Priority Data

Sep. 29, 2015 (JP) .................................. 2015-192218

(51) Int. Cl.
| | |
|---|---|
| H04N 5/225 | (2006.01) |
| H04N 9/73 | (2006.01) |
| H04N 5/235 | (2006.01) |
| H04N 9/77 | (2006.01) |
| H04N 1/407 | (2006.01) |
| H04N 5/243 | (2006.01) |

(52) U.S. Cl.
CPC .......... *H04N 9/735* (2013.01); *H04N 1/4072* (2013.01); *H04N 5/235* (2013.01); *H04N 5/2351* (2013.01); *H04N 5/243* (2013.01); *H04N 9/77* (2013.01)

(58) Field of Classification Search
None
See application file for complete search history.

(56) References Cited

U.S. PATENT DOCUMENTS

| | | | | |
|---|---|---|---|---|
| 6,480,226 | B1* | 11/2002 | Takahashi | ......... H01L 27/14818 |
| | | | | 257/E27.155 |
| 2002/0037101 | A1* | 3/2002 | Aihara | ..................... G06T 5/20 |
| | | | | 382/167 |
| 2007/0008417 | A1* | 1/2007 | Kaplinsky | .............. H04N 9/735 |
| | | | | 348/223.1 |
| 2007/0115372 | A1* | 5/2007 | Wu | ...................... H04N 5/2351 |
| | | | | 348/230.1 |

(Continued)

FOREIGN PATENT DOCUMENTS

| | | |
|---|---|---|
| JP | 2011-175608 A | 9/2011 |
| JP | 2014-153959 A | 8/2014 |

*Primary Examiner* — Twyler L Haskins
*Assistant Examiner* — Dwight Alex C Tejano
(74) *Attorney, Agent, or Firm* — Cowan, Liebowitz & Latman, P.C.

(57) ABSTRACT

An image processing apparatus includes a generation unit configured to generate, from an input image, a plurality of hierarchical images having different frequency bands; a gain calculation unit configured to calculate, for each of the hierarchical images, a gain based on a luminance value for each image area by using a tone conversion curve that is set according to the corresponding frequency band, wherein the tone conversion curve assigns tone with priority to different luminance ranges according to the frequency bands of the hierarchical images; a determination unit configured to determine a combined gain by combining gains that are set for the plurality of hierarchical images; and a conversion unit configured to perform tone conversion on the input image by using the combined gain determined by the determination unit.

12 Claims, 18 Drawing Sheets

(56) References Cited

U.S. PATENT DOCUMENTS

| | | | | |
|---|---|---|---|---|
| 2007/0229863 A1* | 10/2007 | Ono | ............... | G06T 5/008 |
| | | | | 358/1.9 |
| 2008/0007634 A1* | 1/2008 | Nonaka | ............... | G03B 19/02 |
| | | | | 348/234 |
| 2011/0242366 A1* | 10/2011 | Yamashita | ............... | G03B 7/091 |
| | | | | 348/234 |
| 2014/0267885 A1* | 9/2014 | Hirai | ............... | H04N 5/23229 |
| | | | | 348/362 |
| 2015/0054987 A1* | 2/2015 | Ogasawara | ............... | H04N 5/2355 |
| | | | | 348/239 |

\* cited by examiner

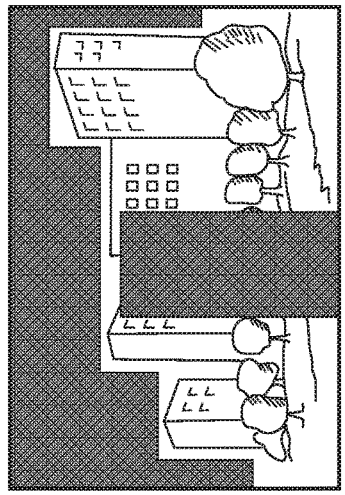
FIG. 5A EVALUATION IMAGE
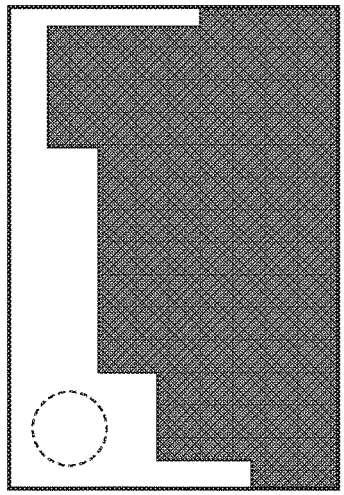
FIG. 5C BACKGROUND AREA
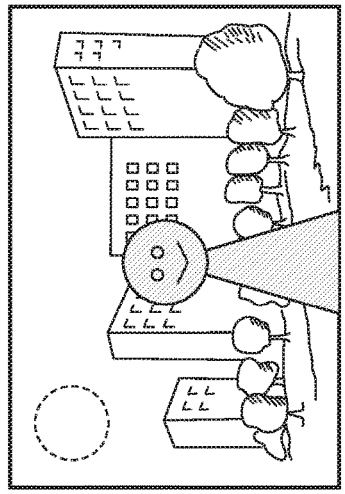
FIG. 5B PERSON AREA
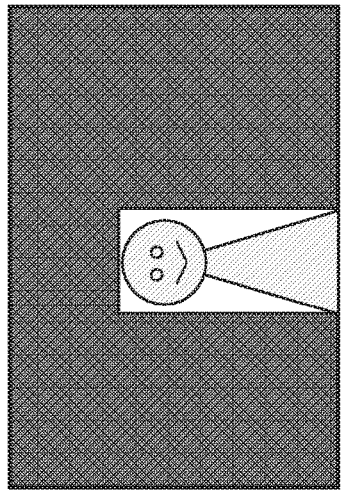
FIG. 5D SKY AREA

MEDIUM LUMINANCE PRIORITY CURVE

HIGH LUMINANCE PRIORITY CURVE

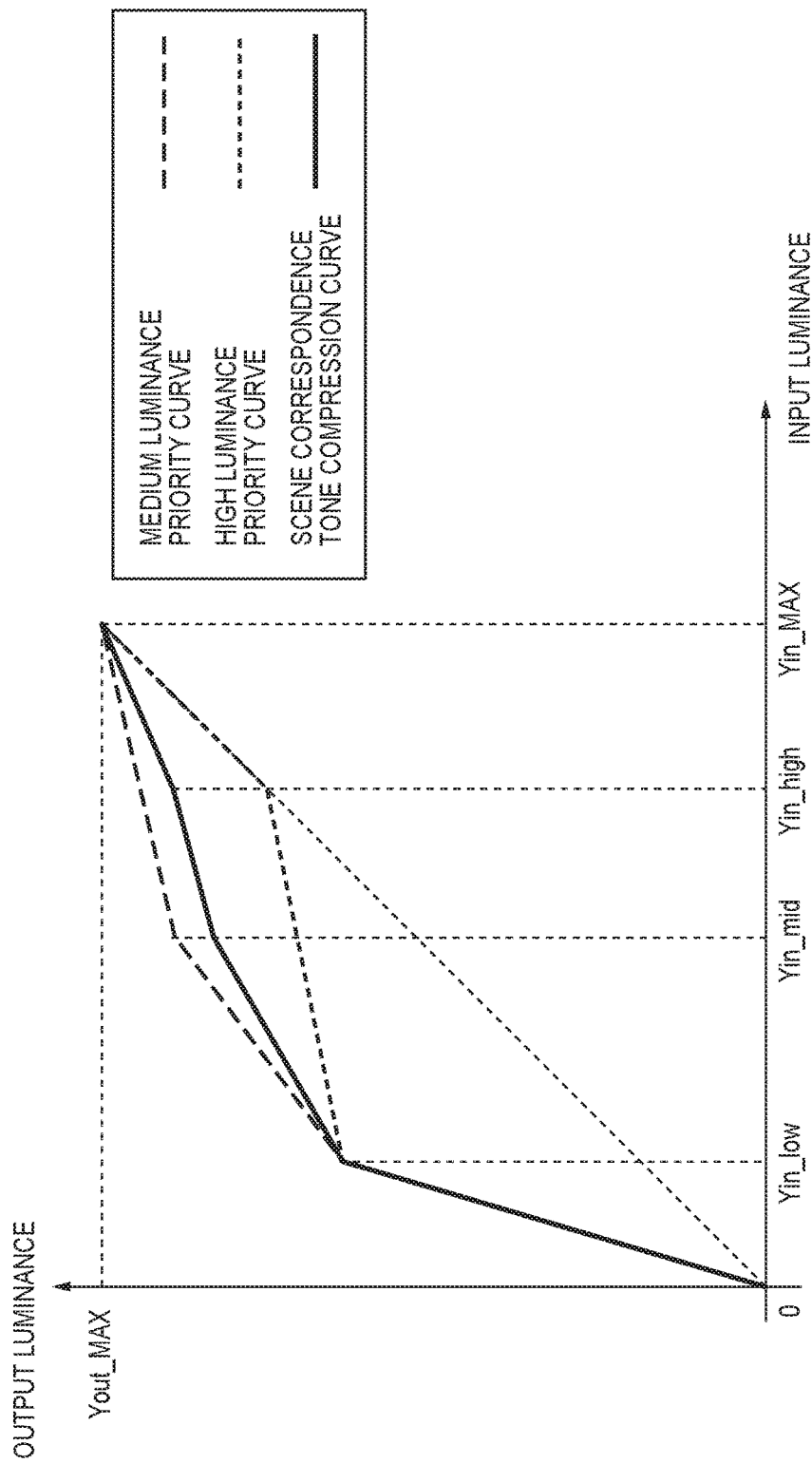

INPUT IMAGE

LUMINANCE VALUE AND GAIN VALUE BETWEEN x1-x2

RESULT OF GAIN PROCESSING USING LOW-FREQUENCY GAIN

RELATIONSHIP BETWEEN GAIN VALUES

RELATIONSHIP BETWEEN DIFFERENCE ABSOLUTE VALUE
AND WEIGHT COEFFICIENT

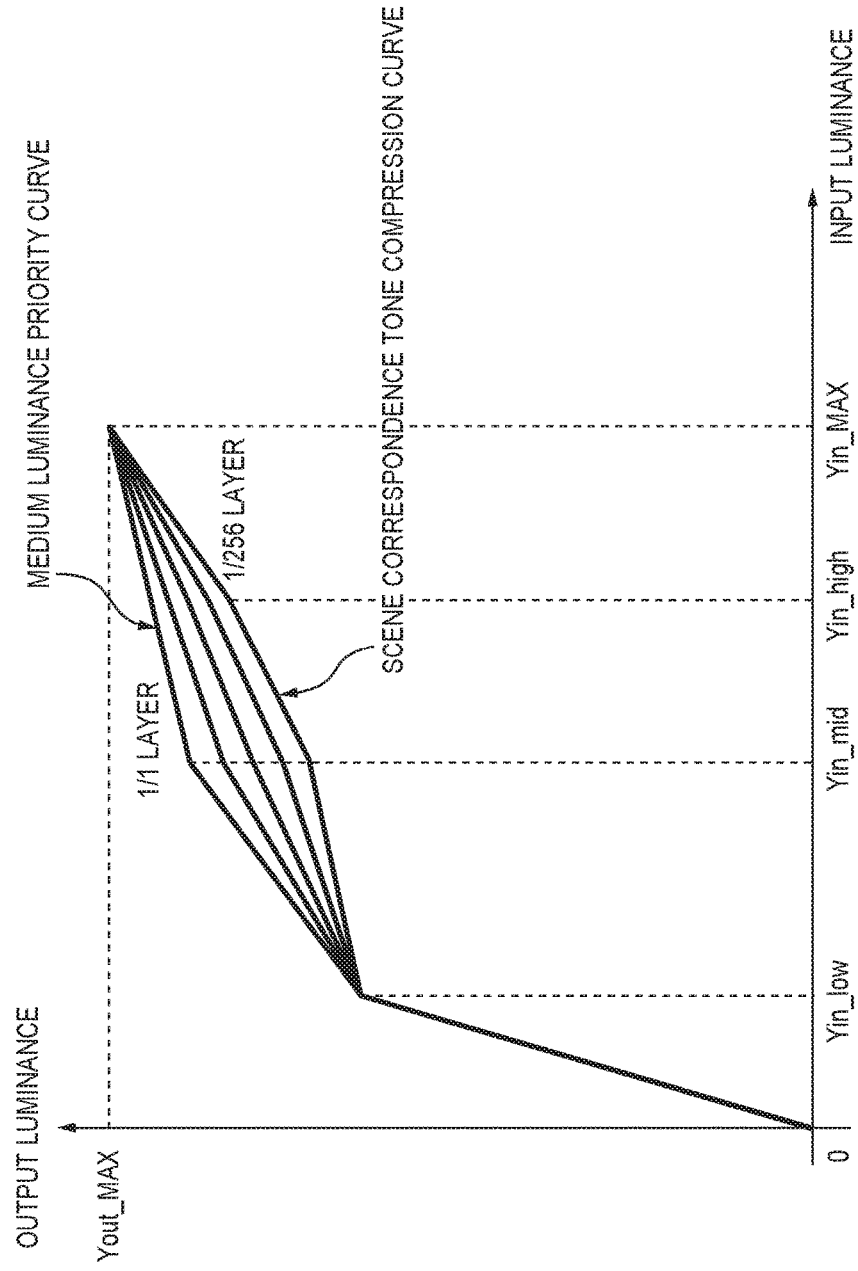

DODGING PROCESSING OFF

DODGING PROCESSING ON

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, and particularly relates to an image processing technique for performing an optimum tone control for each object area within an image.

Description of the Related Art

Conventionally, a technique for locally controlling tones within an image has been known. In the case of performing local brightness compensation for a dark part, this technique is applied, for example, to perform compensation such that an object (especially, a person) that has been captured as a dark image in a backlit scene has a natural brightness. Such a technique is usually called dodging processing (tone compensation process) or the like.

Here, the dodging processing (tone compensation process) will be described in further detail. The dodging processing is achieved by locally obtaining, for luminance values within an input image, a gain from predetermined gain characteristics, and performing gain processing on the input image. The gain characteristics are set such that a larger gain is applied to a portion having a lower luminance. The reason for this is that an object to which the processing is to be applied is darkened in the above-described backlit scene, and thus, a large gain is applied to the low luminance portion including that object, thereby making the object bright in an output image.

However, the input image contains various objects. I the gain characteristics are directly used, for example, to an area with a very local luminance change, such as small shades of trees, the contrast to the surroundings is lost, resulting in an unnatural output image.

To address this problem, one method of dodging processing determines the gain by also using a more global brightness, instead of determining the gain simply by using a very local luminance value of the image. Specifically, the input image is divided into a plurality of images (hereinafter referred to as hierarchical images) having predetermined frequency bands. Then, as a global brightness, a low-frequency gain is calculated from a luminance value in a low-frequency hierarchical image (e.g., an image obtained by blurring the input image with a low-pass filter). Also, a high-frequency gain is calculated from a luminance value in a high-frequency hierarchical image (e.g., the luminance of the input image itself). Then, a final gain amount is calculated by weighting and adding the low-frequency gain and the high-frequency gain.

Examples of the weighting method include a method in which the gain is determined based on the size of the edge of the gain amount at a position of interest. The reason for using this method is that it is necessary to switch gains on a pixel-by-pixel basis so that the switching of the gains will not appear in an image, for example, at a boundary portion between an object darkened due to backlight and a bright sky. This problem becomes prominent when the gain significantly changes at the boundary portion, and therefore, the weight of using the high-frequency gain is increased with an increase in the size of the edge of the gain amount. In this manner, by adaptively changing the weight of using the low-frequency gain and the weight of using the high-frequency gain in each position within an image, a process for compensating for dark parts is performed, while suppressing the unnaturalness of the output image.

FIGS. 18A and 18B are diagrams showing an effect of dodging processing. In FIG. 18A, dodging processing is not performed, and therefore, a backlit person is darkened. On the other hand, in FIG. 18B, dodging processing is performed, and the backlit person is shown with natural brightness close to that it actually appears to be. FIGS. 19A and 19B are graphs showing example of the gain characteristics and the input/output characteristics of the dodging processing. FIG. 19B shows an example of the gain characteristics in which the gain is larger at a portion with a lower luminance. The gain characteristics are calculated from the input/output characteristics shown in FIG. 19A. In a backlit scene as described above, mainly a person area is present in a low luminance range in which the input luminance is Y0 or less, and the output image shows characteristics in which tone is assigned with priority to the low luminance range. The foregoing is the description of the dodging processing.

As the technique for further improving the quality of the output image in dodging processing, various techniques have been proposed. Japanese Patent Laid-Open No. 2014-153959 proposes a technique for adaptively calculating the gain characteristics from a distribution of luminance values of various objects contained in an image. In particular, determining the gain characteristics based on the relationship between the luminance values of the detected object areas is disclosed. Japanese Patent Laid-Open No. 2011-175608 discloses that different types of tone characteristics are set for each of the hierarchical images so as to intentionally saturate a local high luminance range.

However, with the conventional dodging processing, the tones of the other luminance ranges are compressed by an amount corresponding to the amount of compensation for the dark parts of the input image. Consequently, the tone characteristics of the compressed luminance ranges are lost. In the characteristics shown in FIGS. 19A and 19B, luminances belonging to a high luminance range of a luminance value Y1 or more are significantly compressed. In particular, the tone of the sky area and the like is compressed, resulting in a loss of contrast in the output image. The technique disclosed in Japanese Patent Laid-Open No. 2014-153959 analyzes the input image, and adaptively changes the luminance range that are to be compressed. However, some of the luminance ranges are eventually compressed, resulting in an output image in which the tone characteristics are partly lost.

SUMMARY OF THE INVENTION

The present invention has been made in view of the above-described problems, and provides an output image on which a higher quality tone compensation has been performed, while inhibiting the loss of the tone characteristics of a specific luminance range.

According to a first aspect of the present invention, there is provided an image processing apparatus comprising: a generation unit configured to generate, from an input image, a plurality of hierarchical images having different frequency bands; a gain calculation unit configured to calculate, for each of the hierarchical images, a gain based on a luminance value for each image area by using a tone conversion curve that is set according to the corresponding frequency band, wherein the tone conversion curve assigns tone with priority to different luminance ranges according to the frequency bands of the hierarchical images; a determination unit configured to determine a combined gain by combining gains that are set for the plurality of hierarchical images; and a conversion unit configured to perform tone conversion on the input image by using the combined gain determined by the determination unit.

According to a second aspect of the present invention, there is provided an image processing method comprising: generating, from an input image, a plurality of hierarchical images having different frequency bands; calculating, for each of the hierarchical images, a gain based on a luminance value for each image area by using a tone conversion curve that is set according to the corresponding frequency band, wherein the tone conversion curve assigns tone with priority to different luminance ranges according to the frequency bands of the hierarchical images; determining a combined gain by combining gains that are set for the plurality of hierarchical images; and performing tone conversion on the input image by using the combined gain determined by the determining.

Further features of the present invention will become apparent from the following description of exemplary embodiments with reference to the attached drawings.

BRIEF DESCRIPTION OF THE DRAWINGS

FIGS. 5A to 5D are diagrams showing examples of the result of area extraction.

FIG. 8 is a graph showing an example of a scene correspondence tone compression curve.

FIG. 17 is a graph showing an example of a layer-specific tone compression curve in the second embodiment.

DESCRIPTION OF THE EMBODIMENTS

Hereinafter, embodiments of the present invention will be described in detail with reference to the accompanying drawings. The present embodiment assumes a backlit scene in which tone compensation by dodging processing is most required. Note, however, that the present invention is also applicable to scenes other than the backlit scene.

Figure 1:
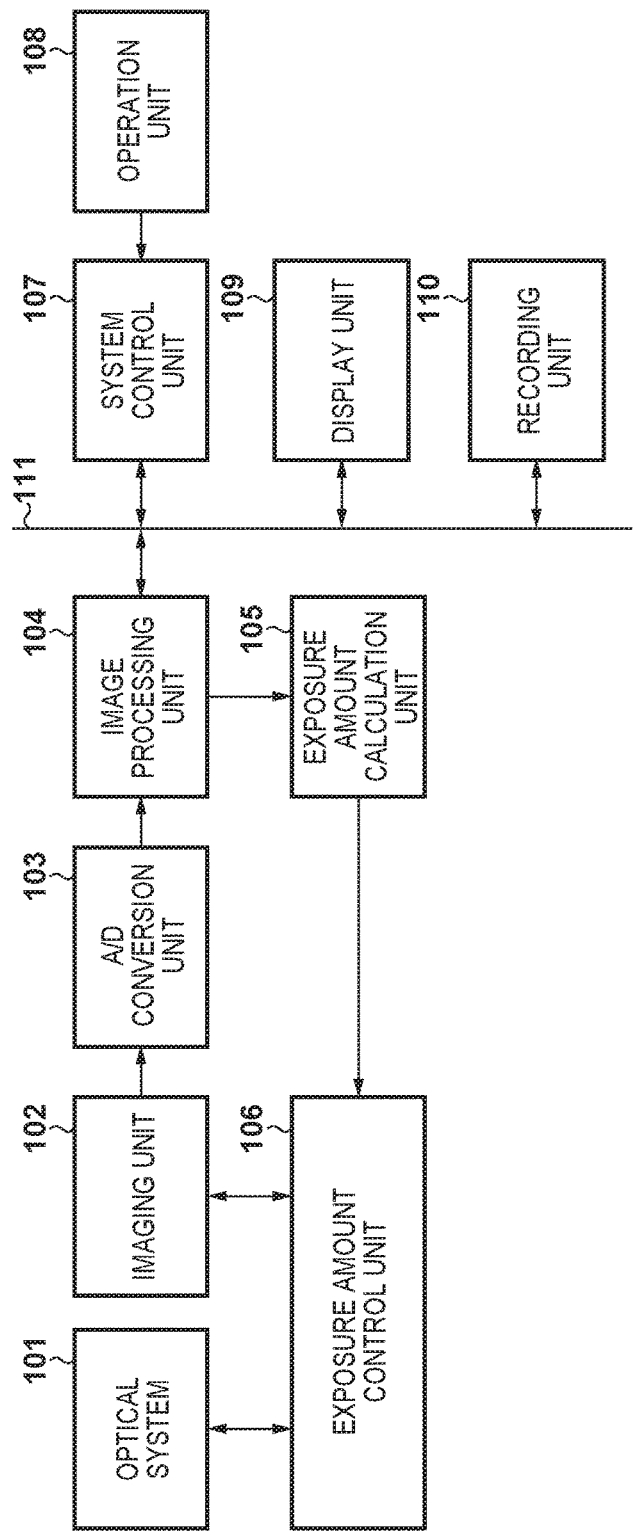
FIG. 1 is a block diagram showing an embodiment to which an image processing apparatus of the present invention is applied to an imaging apparatus.

First, configurations common to embodiments of the present invention will be described. FIG. 1 is a block diagram showing an embodiment in which an image processing apparatus of the present invention is applied to an imaging apparatus. In FIG. 1, an optical system 101 includes a lens group composed of a zoom lens and a focus lens, an aperture adjustment device, and a shutter device. The optical system 101 adjusts the magnification and the focus position of an object image that reaches an imaging unit 102, or the light amount. The imaging unit 102 includes an imaging element, such as a CCD or CMOS sensor, that photoelectrically converts light beams of an object that have passed through the optical system 101 into an electric signal.

An A/D conversion unit 103 converts an input analog image signal into a digital image signal. An image processing unit 104 performs, in addition to normal signal processing, tone compensation process, which is characteristic to the present embodiment. The image processing unit 104 can also perform the same image processing on an image read from a recording unit 110, in addition to an image output from the A/D conversion unit 103.

In order to obtain an optimum input image for performing tone compensation process, an exposure amount calculation unit 105 calculates an exposure amount during shooting. With a processing result from the image processing unit 104 as an input, the exposure amount calculation unit 105 outputs the calculated exposure amount, and inputs the exposure amount to the exposure amount control unit 106. In order to achieve the exposure amount calculated by the exposure amount calculation unit 105, the exposure amount control unit 106 controls the optical system 101 and the imaging unit 102 so as to control the aperture, the shutter speed, and the analog gain of the imaging element.

A system control unit 107 controls and centralizes the overall operation of the imaging apparatus of the present embodiment. The system control unit 107 also controls driving of the optical system 101 and the imaging unit 102, based on a luminance value obtained from an image processed by the image processing unit 104 and an instruction sent from the operation unit 108. A display unit 109 is constituted by a liquid crystal display or an organic EL (Electro Luminescence) display, and displays an image generated by the imaging unit 102 and an image read from the recording unit 110. The recording unit 110 have the function for recording an image, and may include an information recording medium using a package or the like that accommodates, for example, a rotary recording member such as a memory card having a semiconductor memory mounted therein or a magneto-optical disk. This information recording medium may be configured to be removable.

A bus 111 is used for exchanging images between the image processing unit 104, the system control unit 107, the display unit 109, and the recording unit 110. The foregoing are the configurations common to the embodiments. In each of the following embodiments, the description will be focused particularly on tone compensation process performed by the image processing unit 104.

First Embodiment

In a first embodiment of the present invention, a tone compensation process by dodging processing is performed, assuming a scene in which an image of a backlit person is captured.

Figure 2:
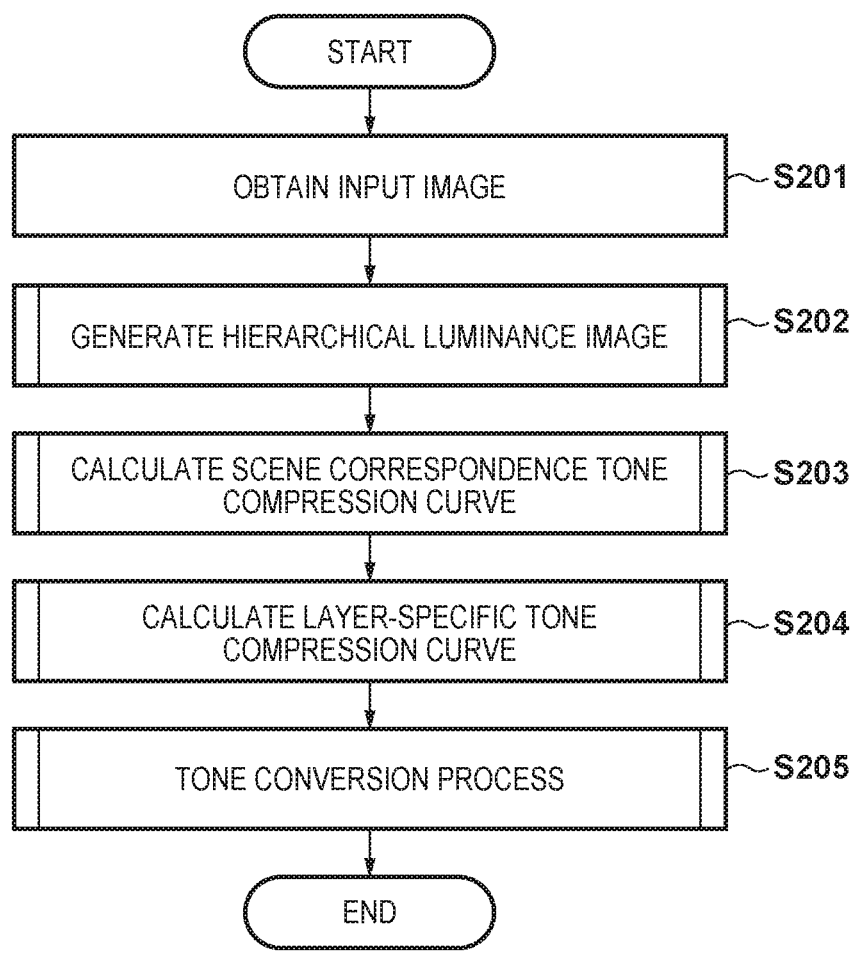
FIG. 2 is a flowchart illustrating the processing executed by an image processing unit is a first embodiment.

FIG. 2 is a flowchart showing the processing executed by the image processing unit 104 in the present embodiment. Various types of processing other than tone compensation process, such as a sensor compensation process and a noise reduction process, are executed in the actual processing. However, the description here is focused on tone compensation process, and the description of the other processes shall be omitted. In the following, the processing executed in the image processing unit 104 of the present embodiment will be described with reference to FIG. 2.

First, at step S201, an input image is acquired. The input image is in the form of a digital image signal output from the A/D conversion unit 103. Next, at step S202, a hierarchical luminance image is generated. The hierarchical luminance image in the present embodiment is generated by performing a stepwise reduction process on the input image (hierarchical image generation).

Figure 3:
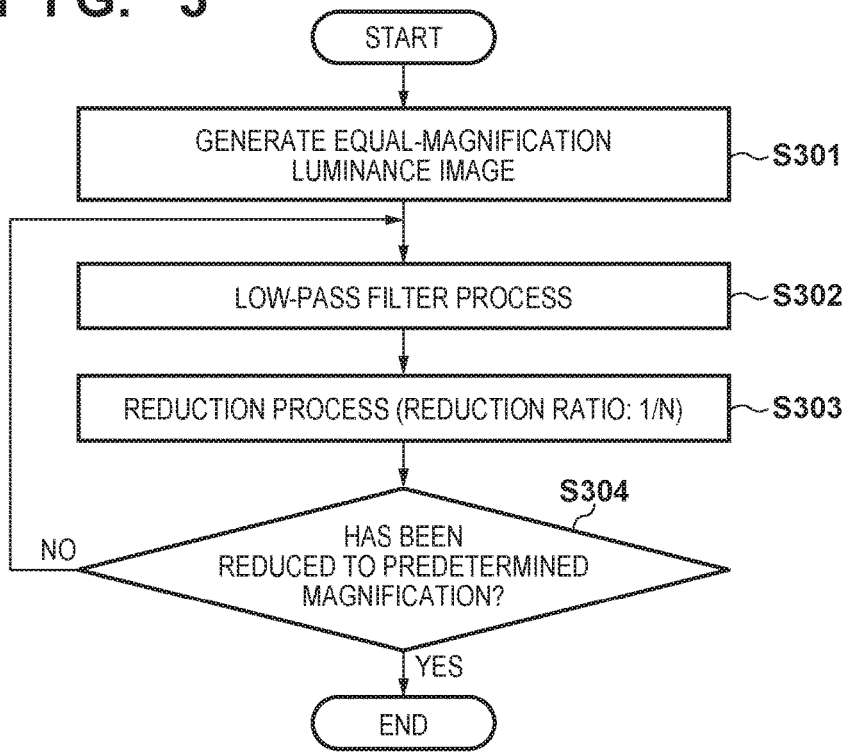
FIG. 3 is a flowchart illustrating the process at step S202 in FIG. 2.

FIG. 3 is a flowchart illustrating the process of step S202. The process of step S202 will be described below with reference to FIG. 3.

First, at step S301, an equal-magnification luminance image is generated. Since this process assumes that the input image is in the form of a sensor output signal such as a Bayer signal, the sensor output signal is converted into a luminance signal by using a predetermined conversion formula. Here, the reduction process is not performed on the image. Next, at step S302, a low-pass filter process is performed on the equal-magnification luminance image. The coefficient of the low-pass filter in this process is determined according to the reduction ratio in the reduction process at step S303. The coefficient of the low-pass filter is set such that a pseudo signal due to folding in the reduction process will not be generated. A known method is used as the setting method. Next, at step S303, a reduction process is performed with a predetermined reduction ratio. Examples of the reduction process include a simple thinning process. In the present embodiment, the reduction ratio 1/N is ¼. Next, at step S304, whether the reduction process has been performed to achieve a predetermined magnification. In the present embodiment, the predetermined magnification is ¹⁄₂₅₆×. If it is determined at step S304 that the reduction process has been performed to achieve the predetermined magnification, the procedure returns to step S302, at which the reduction process is repeated. The foregoing is a flow of the process at step S202.

As a processing result of step S202, a plurality of hierarchical luminance images are generated. In the present embodiment, five hierarchical luminance images at 1×, ¼×, ¹⁄₁₆×, ¹⁄₆₄×, ad ¹⁄₂₅₆× relative to the size of the input image are obtained. Note that the reduction ratio and the predetermined magnification in the present embodiment are merely examples, and it is also possible to set other numerical values. The reduction ratio may not be necessarily the same at the time of generating the hierarchical luminance images.

Next, at step S203, a scene correspondence tone compression curve is calculated. Here, the scene correspondence tone compression curve is a tone compression curve that is set according to the luminance distribution of an input image by analyzing the input image. Some of the processing content of the present step are the same as the processing described in Japanese Patent Laid-Open No. 2014-153959, filed by the Applicant, and the description thereof shall be omitted except for processes relevant to the present embodiment.

Figure 4:
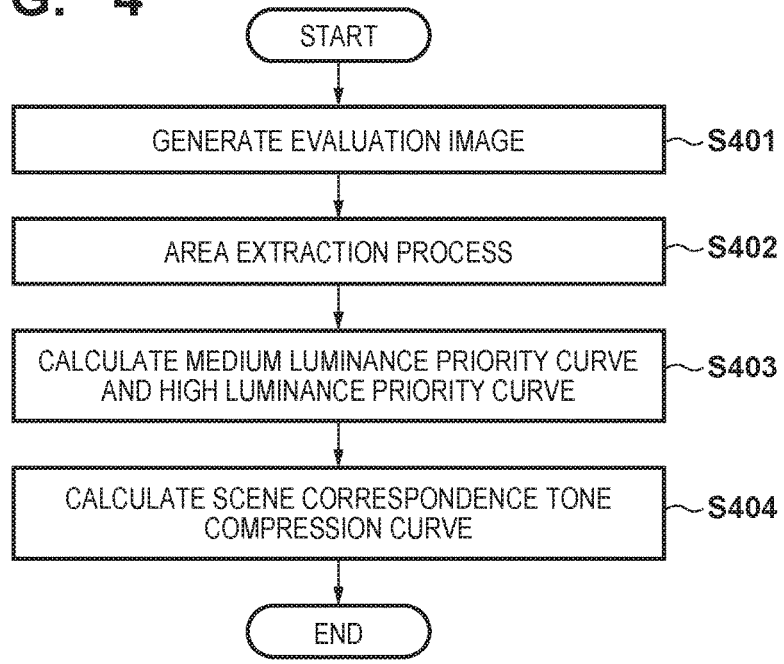
FIG. 4 is a flowchart illustrating the process at step S203 in FIG. 2.

FIG. 4 is a flowchart illustrating the process at step S203. The process of step S203 will be described below with reference to FIG. 4.

First, at step S401, an evaluation image is generated. The evaluation image is an image serving as a basis for calculating the scene correspondence tone compression curve in this process, and is generated from the input image. In the present embodiment, the input image is in the form of a Bayer signal, and the evaluation image is an YHS (luminance, hue, saturation) image. A known method is used for the conversion process from the Bayer signal to the YHS signal.

Next, at step S402, an area extraction process from the evaluation image is performed. In the present embodiment, the areas to be extracted are a person area (main object area), a sky area, and a background area (area that is neither the person area nor the sky area). As the method for extraction, a known method such as the method described in Japanese Patent Laid-Open No. 2014-153959, filed by the Applicant, can be used, and therefore, the detailed description thereof shall be omitted here. FIGS. 5A to 5D are diagrams showing examples of the result of area extraction. FIG. 5A shows an evaluation image. FIGS. 5B, 5C, and 5D show the results of area extraction for a person, the background, and a sky, respectively, and the areas that are not filled with cross-hatching are extracted areas. As shown in FIGS. 5A to 5D, the area extraction is performed at predetermined predetermined block levels.

Next, at step S403, a medium luminance priority curve and a high luminance priority curve are calculated by using the area extraction results (tone compression curve generation). Herein, a curve refers to tone compression characteristics (tone compression curve), and indicates the relationship between an input luminance and an output luminance. Prior to the description of this process, the medium luminance priority curve and the high luminance priority curve will be described.

Figure 6A:
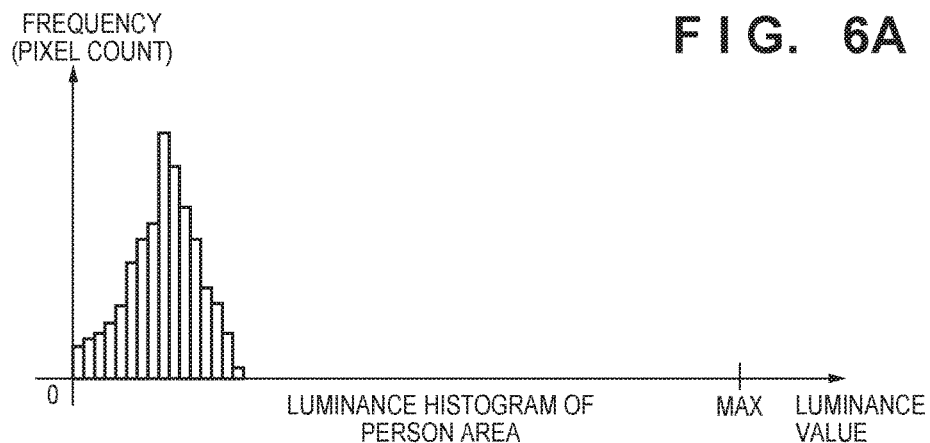
FIGS. 6A to 6C show examples of the luminance histograms of various areas.
Figure 6B:
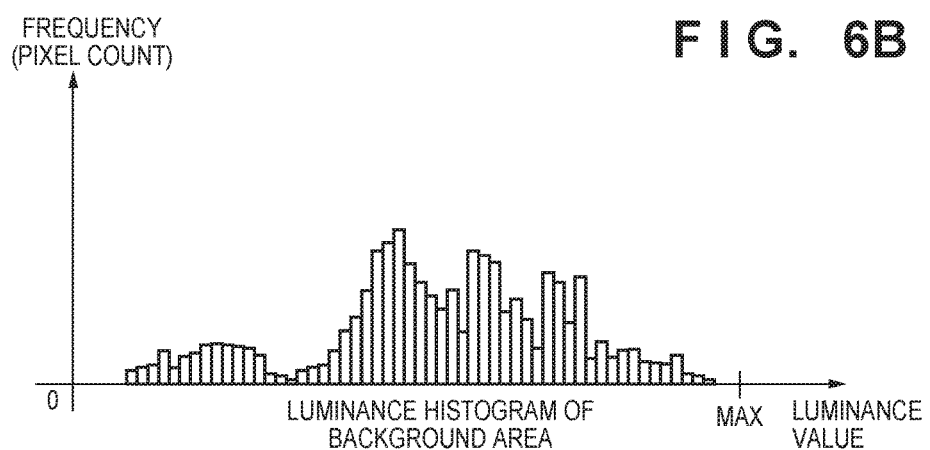
Figure 6C:
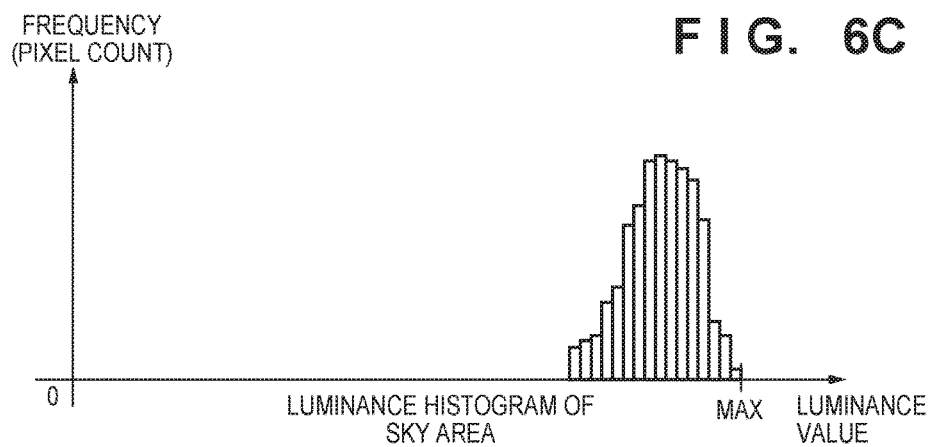

Luminance histograms of the areas in a typical backlit scene are shown in FIGS. 6A to 6C. As shown in FIGS. 6A to 6C, in the backlit scene assumed in the present embodiment, the luminance of the person area is distributed on the low-luminance side, and the luminance of the sky area is distributed on the high-luminance side. Since various objects are present in the background area, the luminance distribution of the background area is wider than those of the person area and the sky area, but is mainly distributed in a medium luminance range having a higher luminance value than the person area and a lower luminance value than the sky area. Note that MAX in FIGS. 6A to 6C represents a maximum luminance value, and the value is determined by the bit precision of the evaluation image. For example, the value of MAX is 255 for a bit precision of 8 bit.

At the time of determining a tone curve, it is important to determine to which luminance range among all input luminance ranges the tone of the output luminance is assigned with priority. In the present embodiment, the highest priority is given to the person area, i.e., a low luminance range. Next, whether it is is appropriate to give priority to the background area or to give priority to the sky area, among the ranges other than the luminance range with the highest priority, depends on the scene. For example, when the sky area has a larger area than the background area, a relatively high priority is given to the sky area, i.e., the high luminance range.

Accordingly, a tone curve is created for each of a case where the luminance range with the second highest priority, next to the person area, is the background area, i.e. the medium range, and a case where the luminance range with the second highest priority is the sky area, i.e., the high luminance range. Then, a final tone curve is obtained by weighting and adding these tone curves according to the scene. The tone curve that gives priority to the medium luminance range is referred to as a medium luminance priority curve, and the tone curve that gives priority to the high luminance range is referred to as a high luminance priority curve. The foregoing is the description of the medium luminance priority curve and the high luminance priority curve.

Figure 7A:
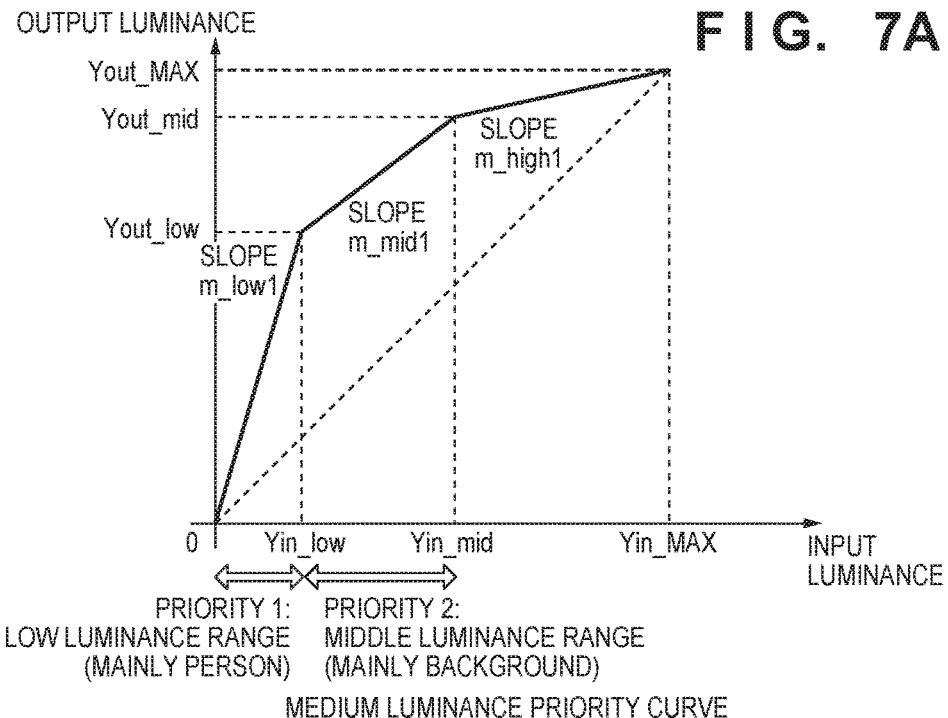
FIGS. 7A and 7B are graphs showing examples of a medium luminance priority curve and a high luminance priority curve.
Figure 7B:
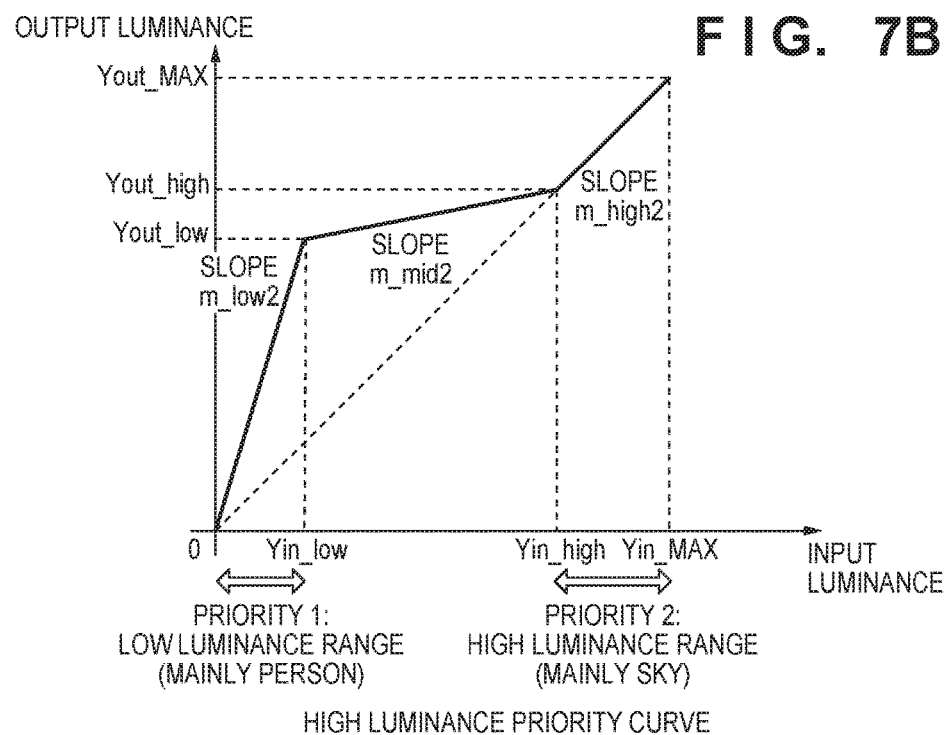

Next, the method for calculating the curves will be described. FIGS. 7A and 7B are graphs showing examples of the medium luminance priority curve and the high luminance priority curve. As shown in FIGS. 7A and 7B, each of the curves is set with a broken line in the present embodiment. Note that Yin_MAX and Yout_MAX are maximum values of the input luminance and the output luminance, respectively, and are determined by the bit precisions of the input and the output, respectively. In the present embodiment, the description will be given assuming Yin_MAX=Yout_MAX.

First, the points of input luminances Yin_low, Yin_mid, and Yin_high at which the broken lines are switched are determined. These points represent luminances in which the major portion of the luminances of the person area, the background area, and the sky area are included. For the calculation of these luminances, the luminance histograms of the areas shown in FIGS. 6A to 6C are used. In the following, the method for calculating the luminance value of each of the points from the histograms will be described, focusing on the method for determination of Yin_low.

For the calculation of Yin_low, the luminance histogram of the person area in FIG. 6A is used. Here, the frequency value of the luminance histogram of the person area is expressed as hist_human(y). y represents the luminance value. The total number of the pixels included in the person area is expressed as N_human. hist_human(y) is accumulated from a luminance value of 0, and Yin_low is defined as the luminance value when the accumulated value exceeds a predetermined ratio k relative to N_human for the first time. This is represented by the following formula:

$$\sum_{y=0}^{Y} \text{hist\_human}(y) \geq k \times \text{N\_human} \tag{1}$$

where Yin_low represents Y that satisfies the formula (1) for the first time. In the present embodiment, the predetermined ratio k is 80 percent of the total, i.e., k=0.8.

In the same manner as above, using the luminance histograms of the background area and the sky area, respectively, Yin_mid and Yin_high are defined as the values of Y that satisfy the following formulas (2) and (3) for the first time.

$$\sum_{y=0}^{Y} \text{hist\_back}(y) \geq k \times \text{N\_back} \tag{2}$$

$$\sum_{y=0}^{Y} \text{hist\_sky}(MAX - y) \geq k \times \text{N\_sky} \tag{3}$$

where hist_back(y) and hist_sky(y) represent the frequency values of the luminance histograms of the background area and the sky area, and N_back and N_sky represent total numbers of pixels contained in the background area and the sky area, respectively. Note that Yin_high is an accumulation from the luminance value MAX, as shown in the formula (3), and is therefore defined as:

$$\text{Yin\_high}=MAX-Y \tag{4}$$

Next, the slope of each line of the medium luminance priority curve is calculated, and a curve is created. First, the slope m_low1 of the conversion line of the low luminance range is calculated from the luminance value of the person area. When Yr_human represents the representative luminance value of the person area in the evaluation image and Yt_human represents the target luminance value of the person, m_low1 is calculated from the following formula (5):

$$m\_\text{low1}=Yt\_\text{human}/Yr\_\text{human} \tag{5}$$

Here, the representative luminance value Yr_human is an average luminance value of the person area, and a known method described in Japanese Patent Laid-Open No. 2014-153959, filed by the Applicant, is used as the calculation method of the target luminance value Yt_human. Similarly, the slope m_mid1 of the conversion line of the medium luminance range is calculated from the luminance value of the background area. When Yr_back represents the representative luminance value of the background area in the evaluation image and Yt_back represents the target luminance value of the background area, m_mid1 is calculated from the following formula (6):

$$m\_\text{mid1}=Yt\_\text{back}/Yr\_\text{back} \tag{6}$$

Here, the representative luminance value Yr_back is an average luminance value of the background area, and a known method described in Japanese Patent Laid-Open No. 2014-153959, filed by the Applicant, is used as the calculation method of the target luminance value Yt_back.

For the medium luminance priority curve, first, a line with slope m_low1 is drawn from the origin in the low luminance range of the input luminance value $0 \leq y \leq \text{Yin\_low}$, and subsequently, a line with slope m_mid1 is drawn from the point (Yin_low, Yout_low) in the medium luminance range of the input luminance value $\text{Yin\_low} \leq y \leq \text{Yin\_mid}$. Finally, a line is drawn from the point (Yin_mid, Yout_mid) so as to connect this point with the point (Yin_MAX, Yout_MAX). Consequently, the slope m_high1 of the conversion line of the high luminance range is represented by the following formula:

$$m\_\text{high1}=(Yout\_MAX-Yout\_\text{mid})/(Yin\_MAX-Yin\_\text{mid}) \tag{7}$$

Next, the slope of each line of the high luminance priority curve is calculated, and a curve is created. First, in the high luminance priority curve as well, the luminance range to which the highest priority is given is the low luminance range. Accordingly, the slope m_low2 of the conversion line of the low luminance range has the same value as the m_low1 of the medium luminance priority curve. Furthermore, the slope m_high2 of the conversion line of the high luminance range is calculated from the luminance value of the sky area. When Yr_sky represents the representative luminance value of the sky area in the evaluation image, and Yt_sky represents the target luminance value of the sky area, m_high2 is calculated from the following formula (8):

$$m\_high2 = Yt\_sky/Yr\_sky \qquad (8)$$

Here, the representative luminance value Yr_sky is an average luminance value of the sky area, and a known method described in Japanese Patent Laid-Open No. 2014-153959, filed by the Applicant is used as the calculation method of the target luminance value Yt_sky.

As with the medium luminance priority curve, the high luminance priority curve is created by first drawing a line with slope m_low2(=m_low1) from the origin in the low luminance range of the input luminance value 0≤y≤Yin_low, and subsequently drawing a line with slope m_high2 from the point (Yin_high, Yout_high) in the high luminance range of Yin_high≤y≤Yin_MAX. Yout_high is calculated from the following formula (9):

$$Yout\_high = m\_high2 \times Yin\_high \qquad (9)$$

Finally, a line is drawn from the point (Yin_low, Yout_low) to connect this line with the point (Yin_high, Yout_high), to create a line of the medium luminance range. Consequently, the slope m_mid2 of the conversion line of the medium luminance range is represented by the following formula:

$$m\_mid2 = (Yout\_high - Yout\_low)/(Yin\_high - Yin\_low) \qquad (10)$$

The foregoing is the calculation method of the medium luminance priority curve and the high luminance priority curve, and the processing content of step S403.

Next, at step S404, a scene correspondence tone compression curve is calculated by weighting and adding the medium luminance priority curve and the high luminance priority curve calculated at step S403. First, the weighting coefficient w_mid of the medium luminance priority curve and the weighting coefficient w_high of the high luminance priority curve are calculated. The weighting coefficients are calculated so as to enhance the appearance of the output image.

Various methods are available as the calculation method of the weighting coefficients, and the present embodiment is not limited to any particularly method. For example, it is possible to use a method in which the weighting coefficients are calculated from the area ratio of the sky area and the background area. The area ratio is in other words a pixel count ratio, and thus is calculated with N_back and N_sky described above, by using the following formulas (11) and (12):

$$w\_mid = N\_back/(N\_back + N\_sky) \qquad (11)$$

$$w\_high = N\_sky/(N\_back + N\_sky) \qquad (12)$$

A method is also available in which the weighting coefficients are determined from the relationship between the luminance values of the areas. This method is described in Japanese Patent Laid-Open No. 2014-153959, filed by the Applicant.

The scene correspondence tone compression curve is obtained by weighting and adding the medium luminance priority curve and the high luminance priority curve by using w_mid and w_high, respectively. FIG. 8 shows the tone curves. In FIG. 8, the broken line indicated by the solid line is the scene correspondence tone compression curve. The foregoing is the processing content of step S203. Through step S203, the scene correspondence tone compression curve is calculated.

Next, at step S204, a layer-specific tone compression curve is calculated. In this process, based on the scene correspondence tone compression curve calculated at step S203, different tone compression curves are calculated for each of the plurality of hierarchical luminance images calculated at step S202. This step is the process most characteristic to the present embodiment.

Prior to the description of this step, an overview of the tone conversion process at step S205 will be described first. The tone conversion process in the present embodiment is performed by multiplying the input image by a gain. The gain is calculated from the luminance value of each of the plurality of hierarchical luminance images, and a final gain value is calculated by weighting and adding a plurality of gain values corresponding to the hierarchical images.

The concept of the above-described weighting will be further described. As discussed in the related art section, performing the tone compensation process based on a very local luminance value results in a loss of contrast, and it is therefore preferable that the tone compensation process is basically performed based on a global luminance. Accordingly, the weight of a gain value (low-frequency gain) calculated based on a hierarchical luminance image of a low-frequency band (having a large reduction ratio) is larger than the weight of a gain value (high-frequency gain) calculated based on an equal-magnification hierarchical luminance image. However, as discussed in the related art section, if tone conversion is performed based on a low-frequency gain in a portion in which the gain value has been drastically switched, a pseudo contour is generated at the boundary portion of the switching.

Figure 9A:
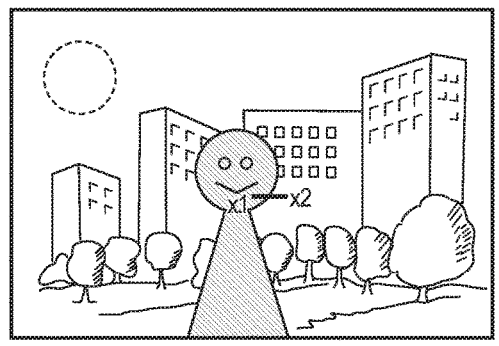
FIGS. 9A to 9C show a problem of gain processing using a low-frequency gain.
Figure 9B:
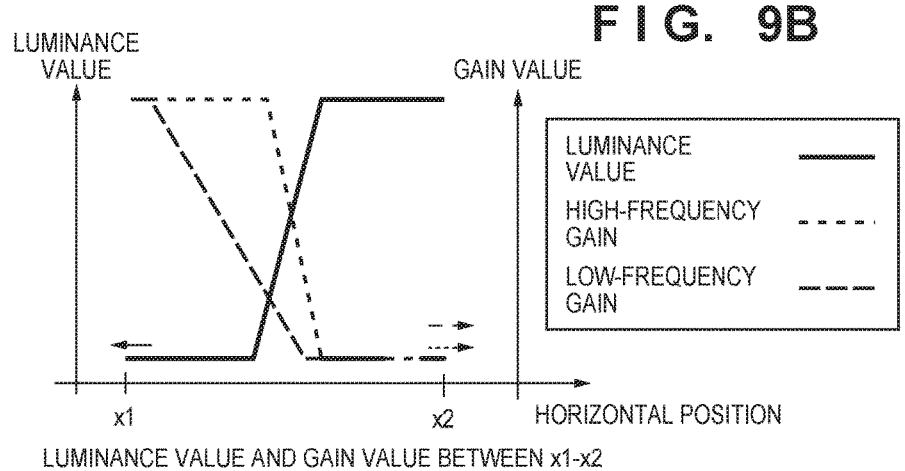
Figure 9C:
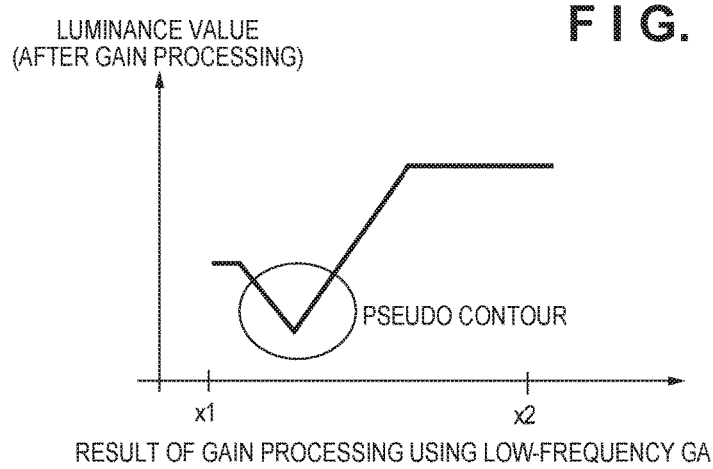

FIGS. 9A to 9C are diagrams showing the problem of the pseudo contour in a simple manner. FIG. 9B is a graph showing the luminance value, the high-frequency gain, and the low-frequency gain between segments x1-x2 in the input image is FIG. 9A. The high-frequency gain and the low-frequency gain are schematically illustrated, rather than representing gains of a certain specific layer. The low-frequency gain is a gain generated from the luminance value obtained by performing blurring with a low-pass filter, and therefore, undergoes a more gradual and slower change than the luminance value of the input image. Accordingly, a luminance value obtained as a result of gain processing using a low-frequency gain causes a pseudo contour at the boundary portion of the switching, as shown in FIG. 9C. For this reason, in segments in which the gain value undergoes a steep change, it is necessary to increase the weight of the high-frequency gain in order to prevent generation of a pseudo contour. On the other hand, in a general scene as shown in FIG. 9A, the sky area has a spatially substantially uniform large luminance value, whereas, it is often the case that in the background area, the luminance value changes spatially non-uniformly in a medium luminance range since various objects such as buildings and trees are present.

Based on the foregoing consideration, it is believed that, in the sky area, a significant gain switching is unlikely to occur and the weight of the low-frequency gain is relatively large, whereas, in the background area, the weight of the high-frequency gain is relatively large due to frequent occurrence of the switching of the gain.

The phenomenon that the present embodiment is to solve is that as a result of assigning tone giving priority to the low luminance range in dodging processing, contrast is lost in the other luminance ranges. For example, when the scene correspondence tone compression curve is infinitely equal to the medium luminance priority curve, the tone of the high luminance range, i.e., the sky area in particular is lost. Then, based on the above-described consideration, it is believed that, in a general scene, there is a difference between the sky area and the background area in terms of the gain frequency (layer) for which the weight is large. Therefore, it is believed that in the low-frequency gain, which has a significant influence on the sky area, the influence of the above-described problem can be reduced by creating a tone curve that gives priority to the high luminance rather than to the medium luminance. This is the concept behind step S204, which is the process characteristic to the present embodiment. Next, the process of step S204 will be described.

Figure 10:
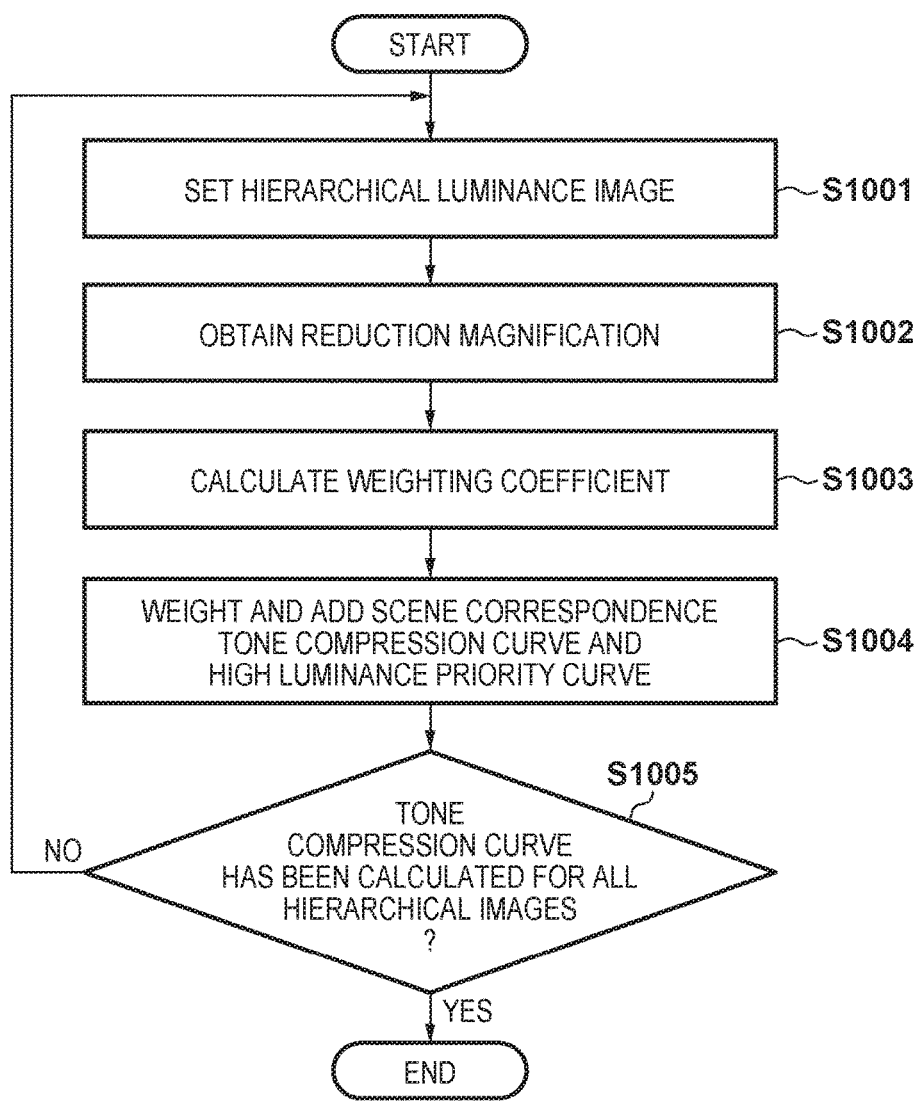
FIG. 10 is a flowchart illustrating the process at step S204 in FIG. 2.

FIG. 10 is a flowchart illustrating the process at step S204. The process of step S204 will be described below with reference to FIG. 10.

First, at step S1001, a certain hierarchical luminance image is set. Here, an equal-magnification hierarchical luminance image is set first. Next, at step S1002, a reduction magnification is acquired. The reduction magnification is a value of the denominator of a reduction ratio (e.g., 1 for an equal-magnification hierarchical luminance image and 4 for x¼ hierarchical luminance image).

Next, at step S1003, a weighting coefficient is calculated from the acquired reduction magnification. Weighting means weighting of the scene correspondence tone compression curve acquired at step S203 and the high luminance priority curve. In accordance with the above-described consideration, control is performed such that a layer of a lower frequency band, i.e., a layer of a larger reduction magnification is more closely approximated to the high luminance priority curve.

Figure 11:
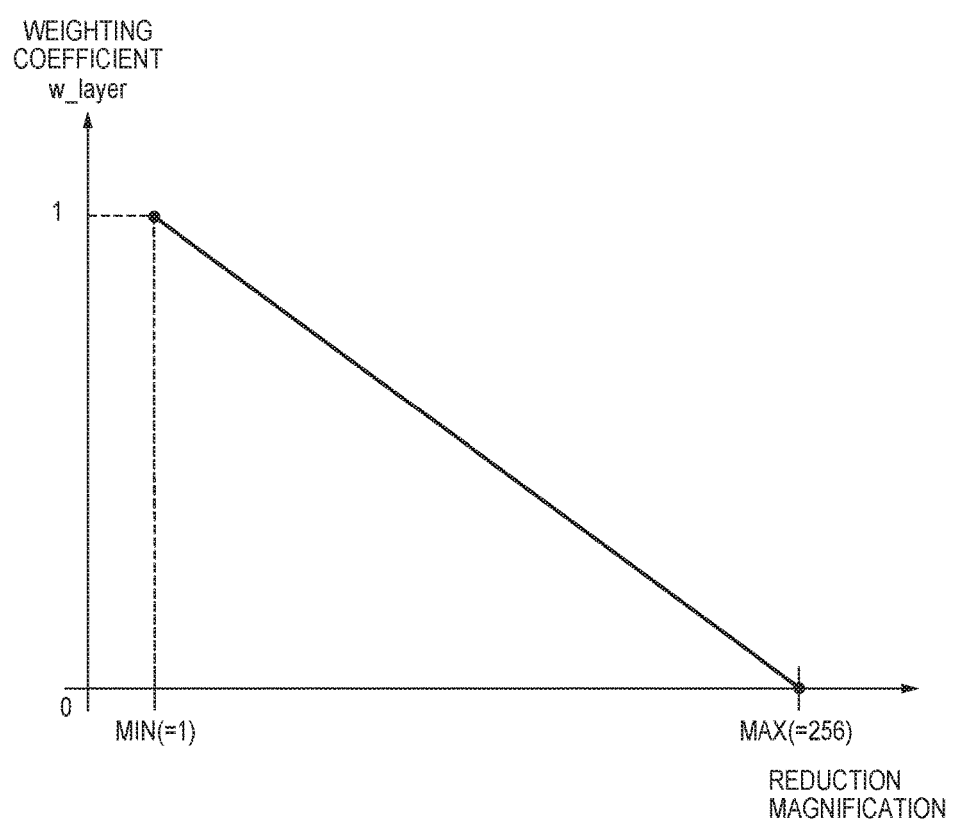
FIG. 11 is a graph showing a relationship between a reduction magnification and a weighting coefficient in the first embodiment.

FIG. 11 is a graph showing a relationship between the reduction magnification and the weighting coefficient w_layer of the scene correspondence tone compression curve. As shown in FIG. 11, w_layer is 0 when the reduction magnification is a maximum (in the present embodiment, 256), and w_layer is 1 when the reduction magnification is a minimum (in the present embodiment, 1). w_layer linearly changes when the reduction magnification is between the maximum and the minimum.

Next, at step S1004, weighting and addition are performed on the scene correspondence tone compression curve and the high luminance priority curve. The weighting and addition result in a tone compression curve of a layer of interest. When f_scene(y) is the scene correspondence tone compression curve, f_high(y) is the high luminance priority curve, and f_layer(y) is the tone compression curve of the layer of interest, f_layer(y) is represented by the following formula (13):

$$f\_layer(y) = w\_layer * f\_scene(y) + (1 - w\_layer) * f\_high(y) \quad (13)$$

where y is the input luminance value. The foregoing is the process of step S1004.

Next, at step S1005, whether the tone compression curve has been calculated for all layers is checked. In the present embodiment, the number of the hierarchical luminance images is 5, and therefore, five tone compression curves are generated. Hereinafter, these tone compression curves are collectively referred to as a layer-specific tone compression curve.

Figure 12:
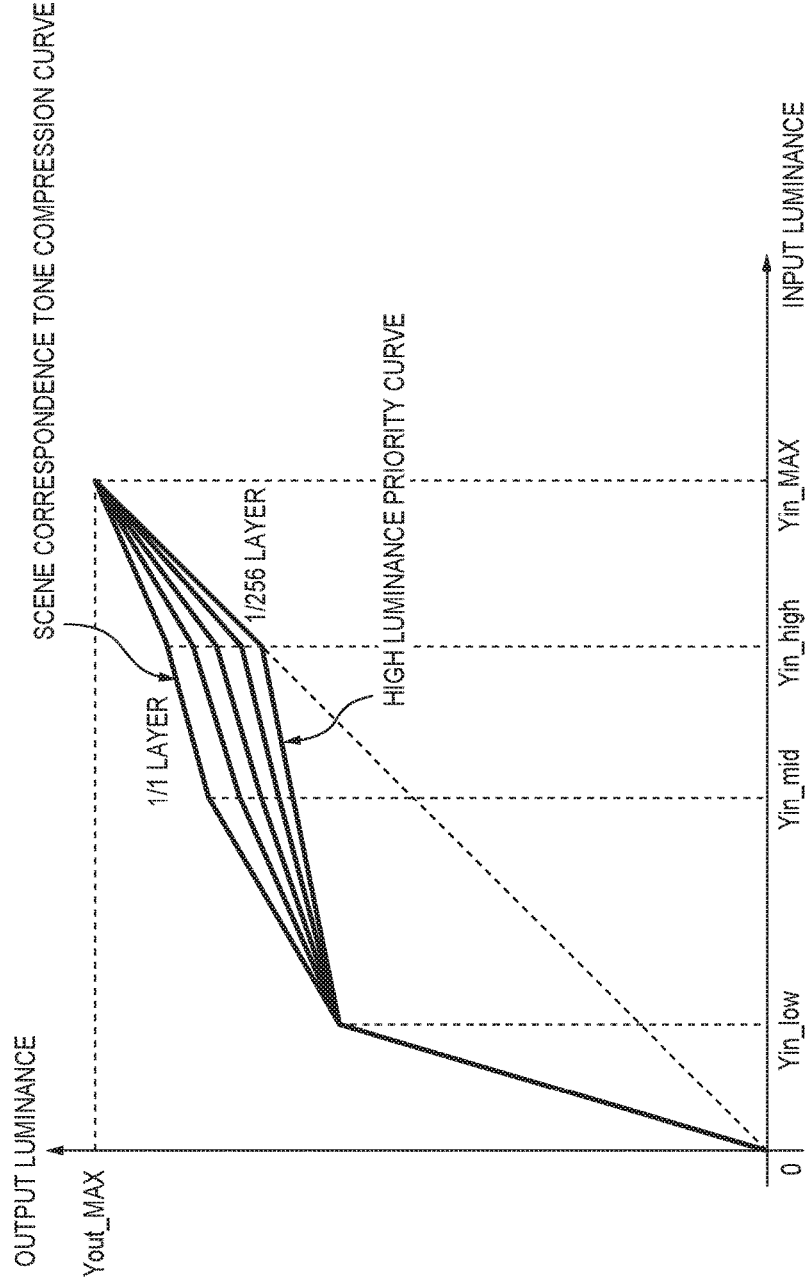
FIG. 12 is a graph showing examples of a layer-specific tone compression curve in the first embodiment.

The foregoing is the process of step S204. Through step S204, a layer-specific tone compression curve is obtained. FIG. 12 is a graph showing an example of the layer-specific tone compression curve. As can be seen from FIG. 12, the feature of the layer-specific tone compression curve lies in that a layer of a lower frequency band (layer of a larger reduction magnification) is more closely approximated to the high luminance priority curve. In other words, as the frequency band of a layer becomes lower, the luminance range to which tone is assigned with priority changes so as to gradually become the high luminance range.

Next, at step S205, a tone conversion process is performed. As described with regard to step S204, the concept behind the tone conversion process at step S205 is that the weight of the high-frequency gain is increase in the range in which the gain undergoes a steep change, and the weight of the low-frequency gain is increase when the gain undergoes a small change.

Figure 13:
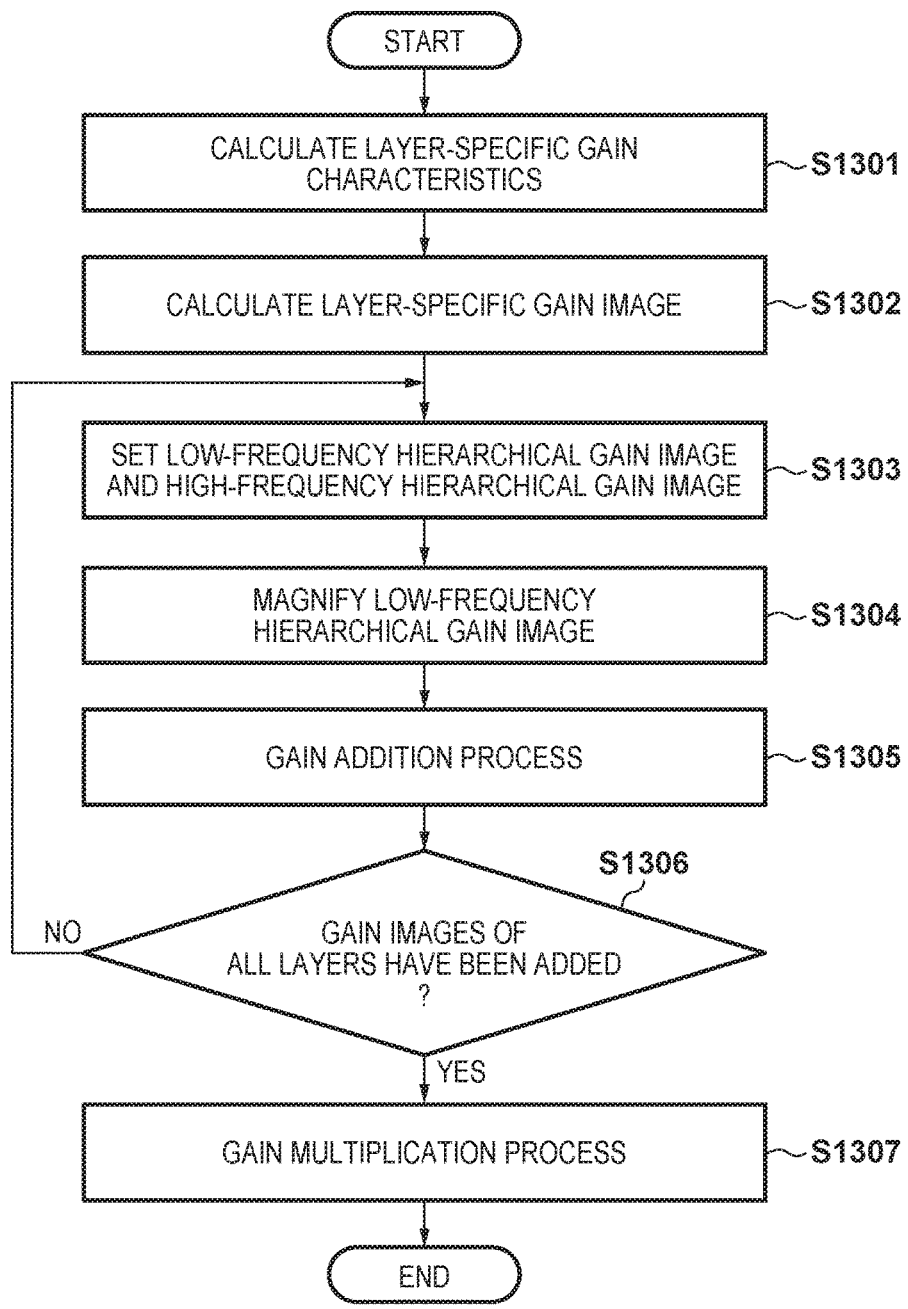
FIG. 13 is a flowchart illustrating the process at step S205 in FIG. 2.

FIG. 13 is a flowchart illustrating the process at step S205. The processing content of step S205 will be described below with reference to FIG. 13.

First, at step S1301, layer-specific gain characteristics are calculated. Here, the gain characteristics refer to the characteristics of the tone conversion gain value relative to the input luminance. The gain characteristics are calculated from the layer-specific tone compression curve calculated at step S204. Since the tone compression curve represents the characteristics of the output luminance value relative to the input luminance, the gain characteristics can be obtained by dividing the output luminance value by the input luminance value. That is, when Gain(Yin) represents the gain value relative to the input luminance value Yin and Yout(Yin) represents the output luminance value, Gain(Yin) is calculated by the following formula (14):

$$Gain(Yin) = Yout(Yin)/Yin \quad (14)$$

The gain characteristics can be calculated by performing the above calculation by using all input luminance values. This process is performed for each layer-specific tone compression curve. In the present embodiment, five curves of layer-specific gain characteristics are obtained.

Next, at step S1302, a layer-specific gain image is calculated. The layer-specific gain image can be calculated by converting each of the luminances of the layer-specific luminance image into a gain by using the above-described layer-specific gain characteristics. The processes from step S1303 onward are processes for adding the gain images calculated for each layer. In the present embodiment, of a plurality of layer-specific gain images, two gain images are sequentially added.

At step S1303, a low-frequency hierarchical gain image and a high-frequency hierarchical gain image are set. First, a gain image or ¹⁄₂₅₆x layer is set as the low-frequency hierarchical gain image, and a gain image of ¹⁄₆₄x layer is set as the high-frequency hierarchical gain image. Next, at step S1304, the low-frequency hierarchical gain image is magnified. This process is performed in order to make the resolutions of the gain images uniform before the gain addition is performed at step S1305. In the present embodiment, the low-frequency hierarchical gain image is magnified four times. A known method is used as the magnification method.

Figure 14A:
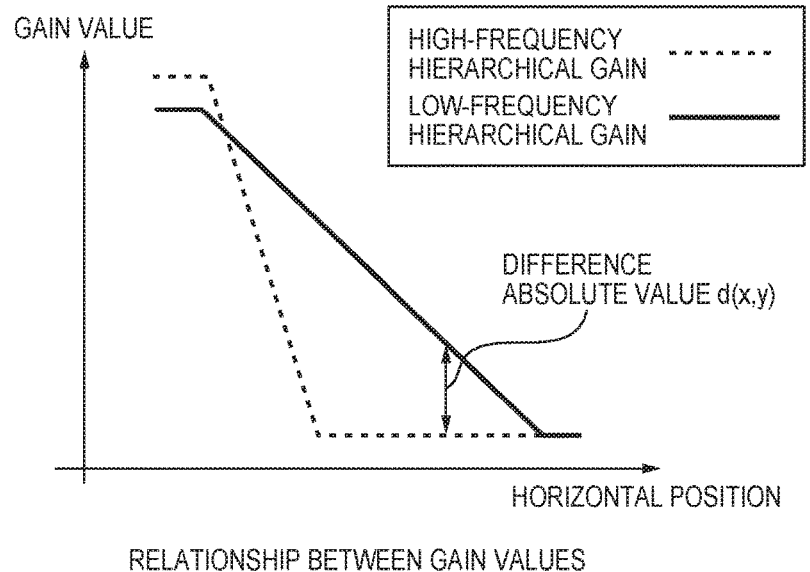
FIGS. 14A and 14B are graphs showing a calculation method of a weight coefficient.
Figure 14B:
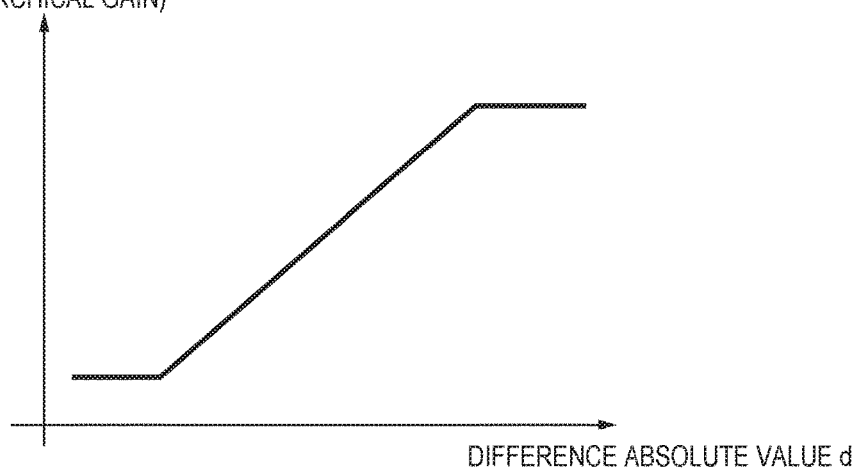

Next, at step S1305, a gain addition process is performed. The gain addition process is performed on all pixels in the gain image. FIG. 14A shows examples of the high-frequency hierarchical gain and the low-frequency hierarchical gain. As an index for determining whether the gain undergoes a steep change, a difference value between the high-frequency hierarchical gain and the low-frequency hierarchical gain at the position of interest (x, y) is used. As shown in FIG. 14A, in a range in which the gain undergoes a steeper change, the difference absolute value d(x, y) between the high-frequency hierarchical gain and the low-frequency hierarchical gain is larger. As can be understood from the foregoing description, the summing weight of the high-frequency hierarchical gain is increased in a range in which the gain undergoes a steep change. Accordingly, the summing weight w_gain of the difference absolute value d and the high-frequency hierarchical gain has qualitative characteristics as shown in FIG. 14B.

Through the foregoing processes, the weight coefficient w_gain(x, y) at the position of interest (x, y) is calculated. The post-addition gain value gain_add(x, y) is calculated from the following formula (15):

$$\text{gain\_add}(x,y) = w\_\text{gain}(x,y)*\text{gain\_high}(x,y) + (1-w\_\text{gain}(x,y))*\text{gain\_low}(x,y) \quad (15)$$

where gain_high(x, y) and gain_low(x, y) represents the high-frequency hierarchical gain and the low-frequency hierarchical gain, respectively, at the position of interest (x, y). w_gain(x, y) takes the value 0≤w_gain(x, y)≤1.

By performing the above-described processing on all (x, y), the gain addition process is performed. The foregoing is the processing content of step S1305, and a post-addition gain image can be obtained as an output.

Next, at step S1306, whether the gain images of all layers have been added is checked. If it is determined that they have not been added, the obtained post-addition gain image is set as the low-frequency hierarchical gain image for the next process, and the next process is executed. For example, when a post-addition gain image is obtained at a resolution of 1/64× layer, the post-addition gain image is set as the low-frequency hierarchical gain image and the gain image of 1/16× layer is set as the high-frequency hierarchical gain image in the next addition process.

If it is determined at step S1306 that all hierarchical images have been added, a gain multiplication process is performed at step S1307. This is a process for multiplying the input image by the gain value of the gain image on which the addition process has been performed. The foregoing is the processing content of step S1306, and an image after the gain multiplication, i.e., an image resulting after performing tone conversion on the input image can be obtained as an output. The foregoing is the processing content of step S205. Hereinabove, the processing executed by the image processing unit 104 in the present embodiment has been described.

As such, according to the present embodiment, a reduction in contrast due to tone compression, which has been the conventional problem, can be suppressed by changing, for each layer, the luminance range to which tone is assigned with priority. In particular, a tone compression curve that gives priority to the high luminance range is created for a layer of a lower frequency band, and therefore, the tone characteristics of the sky area in a backlit scene can be enhanced as compared with the conventional techniques.

Second Embodiment

In the first embodiment, a layer-specific tone compression curve is created at step S204 in FIG. 2 such that the scene correspondence tone compression curve is gradually approximated to the high luminance priority curve with an increase in the reduction magnification. As a result, the tone of the high luminance range is enhanced as compared with the conventional techniques. On the other hand, the tone of the medium luminance range is substantially unchanged from that obtained by the conventional technique. That is, the first embodiment can be considered to be a high luminance range priority mode.

In the present embodiment, unlike the first embodiment, a layer-specific tone compression curve is created as a medium luminance range priority mode. That is, an object of the present embodiment is to further enhance the tone of the background area, which belongs to the medium luminance range, than that of the sky area, which belongs to the high luminance range. Note that the present embodiment also assumes a backlit person scene, and the luminance range to which tone is assigned with the highest priority is the low luminance range including the person area.

Figure 15:
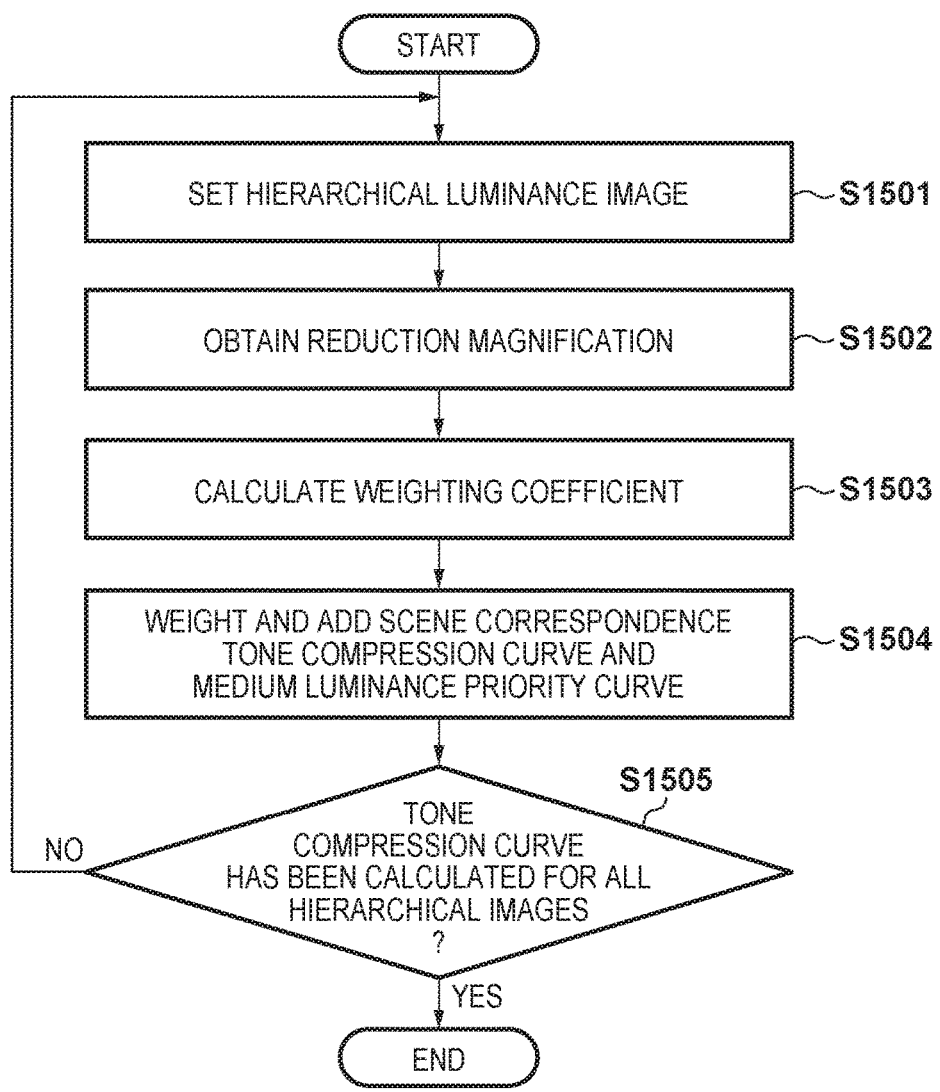
FIG. 15 is a flowchart illustrating the process at step S204 in a second embodiment.

The processing of the present embodiment differs from those of the first embodiment with regard to the process for creating a layer-specific tone compression curve at step S204 in FIG. 2. This process will be described below with reference to the drawings. FIG. 15 is a flowchart illustrating the process of step S204 in the present embodiment. The process of step S204 will be described below with reference to FIG. 15.

First, a hierarchical luminance image is set at step S1501, and the reduction magnification of the corresponding layer is acquired at step S1502. Thus far, the process is the same as the process at step S204 in the first embodiment.

Next, at step S1503, weighting coefficients are calculated. In the present embodiment, the weighting coefficients are the weighting coefficients of the scene correspondence tone compression curve and the medium luminance priority curve. In the process, a layer including a higher frequency band, i.e., a layer having a smaller reduction magnification is more closely approximated to the medium luminance priority curve.

Figure 16:
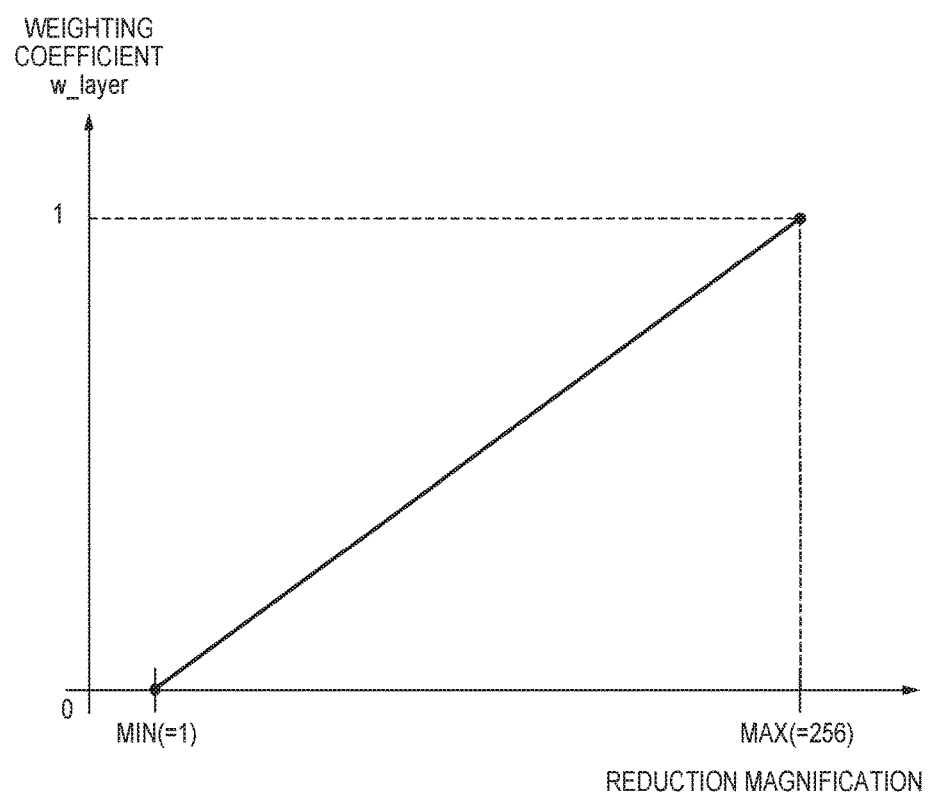
FIG. 16 is a graph showing a relationship between a reduction magnification and a weighting coefficient in the second embodiment.
Figure 18A:
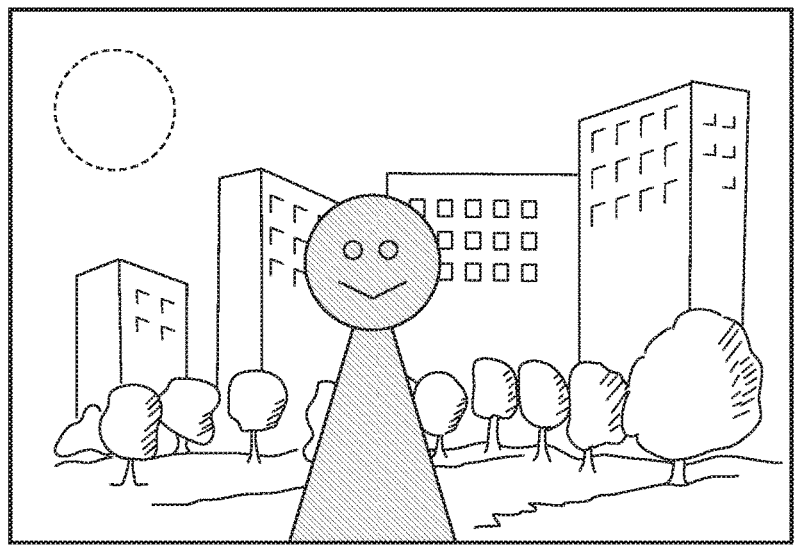
FIGS. 18A and 18B are diagrams showing an effect of dodging processing.
Figure 18B:
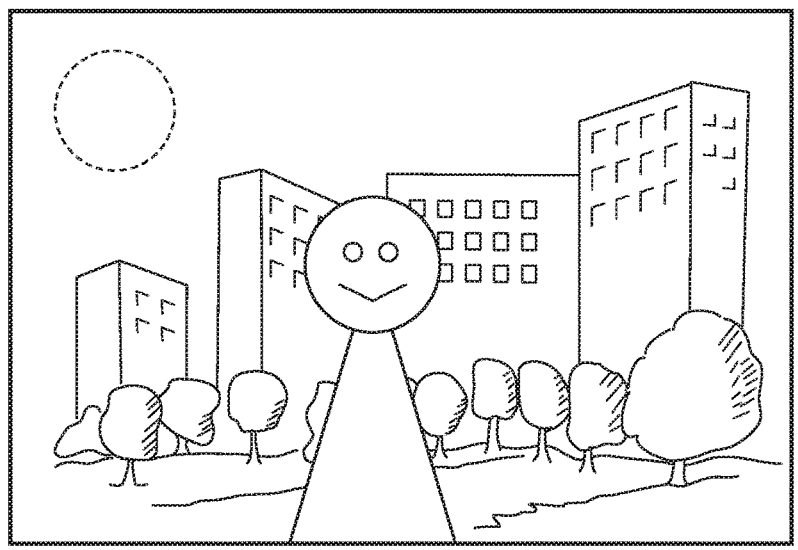
Figure 19A:
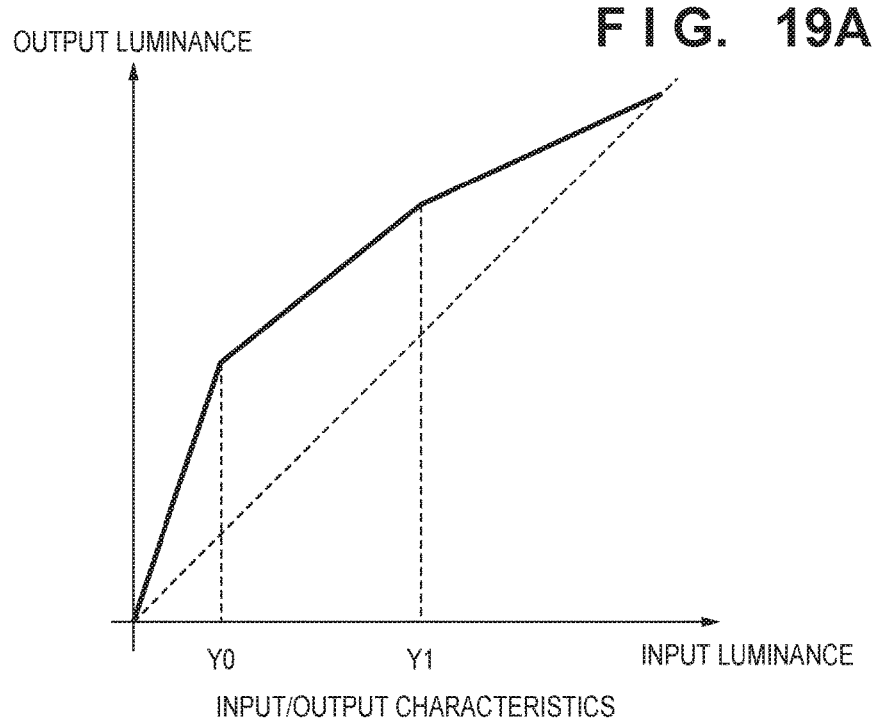
FIGS. 19A and 19B are graphs showing examples of input/output characteristics and gain characteristics in the dodging processing.
Figure 19B:
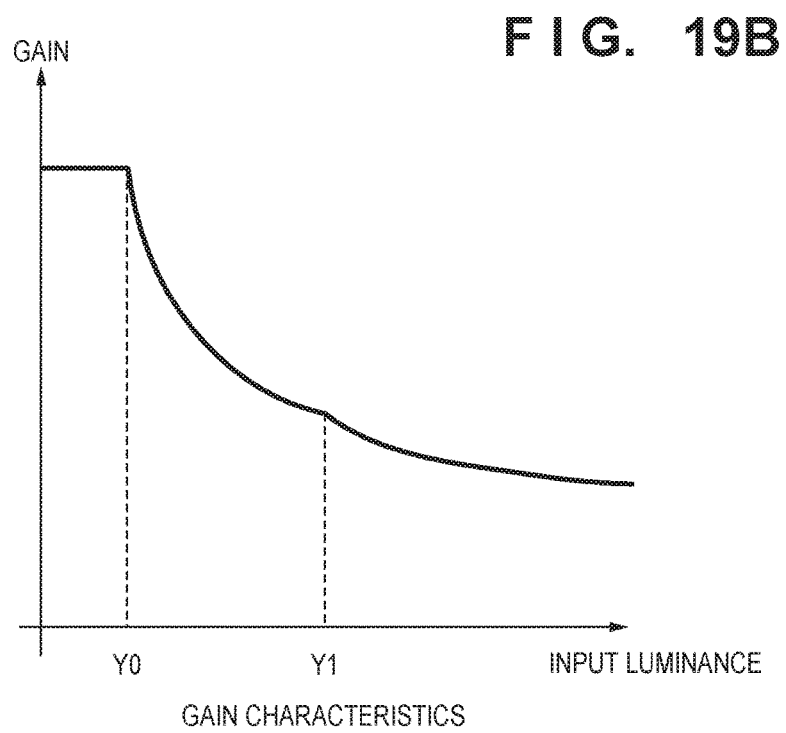

FIG. 16 is a graph showing a relationship between the reduction magnification and the weighting coefficient w_layer of the scene correspondence tone compression curve. The difference from FIG. 11 in the first embodiment is that w_layer is 1 when the reduction magnification is a maximum (in the present embodiment, 256), and w_layer is 0 when the reduction magnification is a minimum (in the present embodiment, 1).

Next, at step S1504, the scene correspondence tone compression curve and the medium luminance priority curve are weighted and added. The weighting and addition result in a tone compression curve of a layer of interest. When f_scene (y) is the scene correspondence tone compression curve, f_mid(y) is the medium luminance priority curve, and f_layer(y) is the tone compression curve of the layer of interest, f_layer(y) is represented by the following formula (16):

$$f\_\text{layer}(y) = w\_\text{layer}*f\_\text{scene}(y) + (1-w\_\text{layer})*f\_\text{mid}(y) \quad (16)$$

where y is the input luminance value. The foregoing is the process of step S1504.

Next, at step S1505, whether the tone compression curve has been calculated for all layers is checked. This process is the same as the process of step S204 in the first embodiment.

The foregoing is the process of step S204 in the present embodiment. Through step S204, a layer-specific tone compression curve is obtained. FIG. 17 shows an example of the layer-specific tone compression curve. As can be seen from FIG. 17, the feature of the layer-specific tone compression curve lies in that a layer of a higher frequency band (layer of a smaller reduction magnification) is more closely approximated to the medium luminance priority curve. In other words, as the frequency band of a layer becomes higher, the luminance range to which tone is assigned with priority changes so as to gradually become the medium luminance range.

As such, according to the present embodiment, a reduction in contrast due to tone compression, which has been the conventional problem, can be suppressed by changing, for each layer, the luminance range to which tone is assigned with priority. In particular, a tone compression curve that gives priority to the medium luminance range is created for a layer of a higher frequency band, and therefore, the tone characteristics of the background area in a backlit scene can be enhanced as compared with the conventional techniques.

Although preferred embodiments of the present invention have been described above, the present invention is not limited to these embodiments, and various modifications can be made without departing from the spirit of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-192218, filed Sep. 29, 2015, which is hereby incorporated by reference herein in its entirety.

What is claimed is:

1. An image processing apparatus comprising:
at least one processor or circuit configured to perform the operations of the following units:
a generation unit configured to generate, from an input image, a plurality of hierarchical images having different frequency bands;
a gain calculation unit configured to calculate, for each of the hierarchical images, a gain based on a luminance value for each image area by using a tone conversion curve that is set according to the corresponding frequency band, wherein the tone conversion curve assigns tone with priority to different luminance ranges according to the frequency bands of the hierarchical images;
a determination unit configured to determine a combined gain by combining gains that are set for the plurality of hierarchical images;
a conversion unit configured to perform tone conversion on the input image by using the combined gain determined by the determination unit; and
a tone conversion curve generation unit configured to generate, based on the input image, a plurality of tone conversion curves including a first tone conversion curve and a second tone conversion curve that assigns tone with priority to a different luminance range from the first tone conversion curve, and generate a tone conversion curve for each of the plurality of hierarchical images by weighting and adding the plurality of tone conversion curves, wherein the tone conversion curve generation unit performs the adding by varying weights of the first tone conversion curve and the second tone conversion curve according to the frequency bands of the hierarchical images.

2. The image processing apparatus according to claim 1, wherein the gain calculation unit calculates the gain by using a tone conversion curve that assigns tone to a hierarchical image having a relatively low frequency band, giving higher priority to a high luminance range.

3. The image processing apparatus according to claim 1, wherein the generation unit generates the plurality of hierarchical images by reducing the input image at a predetermined reduction ratio.

4. The image processing apparatus according to claim 1, wherein the at least one processor or circuit is configured to further perform the operations of a determination unit configured to determine a luminance range to which tone is to be assigned with highest priority from the input image.

5. The image processing apparatus according to claim 4, wherein the luminance range to which tone is to be assigned with highest priority is a luminance range of a person area or a luminance range of a main object area in the input image.

6. The image processing apparatus according to claim 4, wherein the tone conversion curve generation unit generates tone conversion curves that give priority to the tone of a low luminance range and the tone of a high luminance range, respectively, when the luminance range to which tone is to be assigned with highest priority is absent in the input image.

7. The image processing apparatus according to claim 4, wherein the tone conversion curve generation unit, after assigning tone to the luminance range to which a tone is to be assigned with highest priority, generates tone conversion curves that give priority to the tone of a low luminance range and the tone of a high luminance range, respectively, for luminance ranges other than the luminance range to which tone is to be assigned with highest priority.

8. The image processing apparatus according to claim 7, wherein the low luminance range and the high luminance range are calculated from representative luminance values of a sky area and a background area, respectively, in the input image.

9. The image processing apparatus according to claim 1, wherein at least one of the first tone conversion curve and the second tone conversion curve is calculated from a relationship between luminance values of objects contained in the input image.

10. The image processing apparatus according to claim 1, wherein the plurality of hierarchical images are luminance images obtained by converting image signals into luminance signals.

11. An image processing method comprising:
generating, from an input image, a plurality of hierarchical images having different frequency bands;
calculating, for each of the hierarchical images, a gain based on a luminance value for each image area by using a tone conversion curve that is set according to the corresponding frequency band, wherein the tone conversion curve assigns tone with priority to different luminance ranges according to the frequency bands of the hierarchical images;
determining a combined gain by combining gains that are set for the plurality of hierarchical images;
performing tone conversion on the input image by using the combined gain determined by the determining; and
generating, based on the input image, a plurality of tone conversion curves including a first tone conversion curve and a second tone conversion curve that assigns tone with priority to a different luminance range from the first tone conversion curve, and generate a tone conversion curve for each of the plurality of hierarchical images by weighting and adding the plurality of tone conversion curves, wherein the adding is performed by varying weights of the first tone conversion curve and the second tone conversion curve according to the frequency bands of the hierarchical images.

12. A storage medium storing a program for causing a computer to execute steps of an image processing method, the image processing method comprising:
generating, from an input image, a plurality of hierarchical images having different frequency bands;
calculating, for each of the hierarchical images, a gain based on a luminance value for each image area by using a tone conversion curve that is set according to the corresponding frequency band, wherein the tone conversion curve assigns tone with priority to different luminance ranges according to the frequency bands of the hierarchical images;
determining a combined gain by combining gains that are set for the plurality of hierarchical images;
performing tone conversion on the input image by using the combined gain determined by the determining; and
generating, based on the input image, a plurality of tone conversion curves including a first tone conversion curve and a second tone conversion curve that assigns tone with priority to a different luminance range from the first tone conversion curve, and generate a tone conversion curve for each of the plurality of hierarchical images by weighting and adding the plurality of tone conversion curves, wherein the adding is performed by varying weights of the first tone conversion curve and the second tone conversion curve according to the frequency bands of the hierarchical images.

* * * * *